US008085278B2

(12) United States Patent
Hwang et al.

(10) Patent No.: US 8,085,278 B2
(45) Date of Patent: Dec. 27, 2011

(54) METHOD FOR SETTING COMPENSATION REGION FOR IRREGULAR DEFECT REGION IN MANAGE DISPLAY DEVICE

(75) Inventors: Jong Hee Hwang, Gyeonggi-do (KR); Hye Jin Kim, Seoul (KR); Ju Seong Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 494 days.

(21) Appl. No.: 12/318,267

(22) Filed: Dec. 23, 2008

(65) Prior Publication Data

US 2010/0053204 A1 Mar. 4, 2010

(30) Foreign Application Priority Data

Aug. 26, 2008 (KR) ........................ 10-2008-0083299

(51) Int. Cl.
*G09G 5/00* (2006.01)
*G09G 3/30* (2006.01)
*G09G 5/10* (2006.01)
*G02F 1/13* (2006.01)

(52) U.S. Cl. ........... 345/618; 345/77; 345/690; 349/192

(58) Field of Classification Search ................... 345/622
See application file for complete search history.

(56) References Cited

U.S. PATENT DOCUMENTS

2006/0165311 A1* 7/2006 Watson ......................... 382/286
2007/0126975 A1* 6/2007 Choi et al. .................... 349/192
2008/0049051 A1* 2/2008 Han et al. ...................... 345/690

* cited by examiner

*Primary Examiner* — Kee M Tung
*Assistant Examiner* — Sing-Wai Wu
(74) *Attorney, Agent, or Firm* — Morgan, Lewis & Bockius LLP

(57) ABSTRACT

The present invention relates to a method for setting a compensation region for an irregular defect region in an image display device, including the steps of detecting an irregular display defect, setting a horizontal width of the irregular defect region detected thus, generating a plurality of guide lines which divide the irregular defect region in a horizontal direction along the horizontal width set thus automatically, setting upper and lower side boundary lines to the irregular defect region at every interval of the plurality of the guide lines to generate a plurality of main compensation regions defined by the plurality of guide lines and the upper and lower side boundary lines, and generating a plurality of upper, lower, left, and right supplementary compensation regions at upper, lower, left, and right sides of the plurality of main compensation regions, which maintain a gap of each of the plurality of the guide lines, automatically.

7 Claims, 8 Drawing Sheets

Coordinates of compensation regions
for one irregular defect region
x coordinates : 24

Coordinates of compensation regions
for a first regular defect region
x coordinates : 13
y coordinates : 30

Coordinates of compensation regions
for a second regular defect region
x coordinates : 11
y coordinates : 20

METHOD FOR SETTING COMPENSATION REGION FOR IRREGULAR DEFECT REGION IN MANAGE DISPLAY DEVICE

This application claims the benefit of the Patent Korean Application No. 10-2008-0083299, filed on Aug. 26, 2008, which is hereby incorporated by reference as if fully set forth herein.

BACKGROUND OF THE INVENTION

1. Field of the Invention

The present invention relates to image display devices, and more particularly, to a method for setting a compensation region for an irregular defect region in an image display device, which can set a compensation region by applying the same algorithm regardless of kinds of irregular display defects.

2. Discussion of the Related Art

Currently, as the image display devices, flat display devices, such as liquid crystal display device LCD, plasma display panel PDP, organic light emitting diode OLED, are used, mostly.

The image display device passes through an inspection process for detecting a display defect after finishing fabrication of a display panel which is to display an image. Though the display panel having the display defect detected in the inspection process passes through a repair process for the defective portion, there is the display defect that can not be repaired even by the repair process.

The display defect is caused mostly by variation of exposure quantity come from superimposition of the exposures and aberration of multi-lens at the time of multi-exposure by an exposing apparatus used in a thin film pattern forming process. The variation of exposure quantity causes variation a width of the thin film pattern, to vary parasitic capacitance of the thin film transistor, a height of a column spacer which maintains a cell gap, and parasitic capacitance between signal lines. The variations cause brightness variation, resulting to display a regular display defect in a form of horizontal lines or vertical lines. Following reduction of a gap between the liquid crystal display panel and a back light unit for making the liquid crystal display device slimmer, the regular display defect can be displayed, which has a form of horizontal lines corresponding to locations of a plurality of lamps due to shortage of a light diffusion path. In the display defect, there are, not only the regular display defect, but also an irregular defect caused by a defective process, such as infiltration of foreign matters, pinholes, or so on. Because the regular and irregular defects can not be solved by improvement of the process technology, a method is taken into consideration recently, in which brightness of a display defect region is compensated by a data compensating method.

In order to compensate brightness of the display defect region by the data compensating method, a work is required, in which a compensation region for the display defect region detected in the inspection process is set appropriately, and a compensation data is set appropriately taking a difference of brightness between the compensation region and a non-compensation region (i.e., a normal region) into account.

In the meantime, since the irregular defect regions has a variety of shapes compared to the regular defect regions, a work for setting position information on the irregular defect regions, i.e., coordinate information is difficult. For an example, a method for extracting a boundary coordinate along a boundary of the irregular defect region by clicking a mouse has problems in that operation is complicate, and a long time period is required, because there are lots of coordinates to be set, and the operation of setting the coordinate information varies with shapes of the irregular defect regions. Moreover, since there is no reference for a method for setting the boundary coordinates of the irregular defect region, to set the compensation region varied with operators, matching between the defect region and the compensation region becomes poor.

Moreover, the irregular defect region requires a large amount of coordinate information compared to the regular defect region. Consequently, if the coordinate information on the irregular defect region and the coordinate information on the regular defect region are stored in spaces of a memory different from each other respectively, a problem of increased memory capacity takes place.

SUMMARY OF THE INVENTION

Accordingly, the present invention is directed to a method for setting a compensation region for an irregular defect in an image display device.

An object of the present invention is to provide a method for setting a compensation region for an irregular region in an image display device, which is simple and applicable to defects regardless of kinds of the defects.

Another object of the present invention is to provide a method for setting a compensation region in an image display device, which can reduce a capacity of a memory.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for setting a compensation region for an irregular defect region includes the steps of detecting an irregular display defect, setting a horizontal width of the irregular defect region detected thus, generating a plurality of guide lines which divide the irregular defect region in a horizontal direction along the horizontal width set thus automatically, setting upper and lower side boundary lines to the irregular defect region at every interval of the plurality of the guide lines to generate a plurality of main compensation regions defined by the plurality of guide lines and the upper and lower side boundary lines, and generating a plurality of upper, lower, left, and right supplementary compensation regions at upper, lower, left, and right sides of the plurality of main compensation regions, which maintain a gap of each of the plurality of the guide lines, automatically.

The interval has a fixed width calculated by dividing the horizontal width of the irregular defect region with a preset numeral, and the plurality of the upper and lower side supplementary compensation regions have vertical ratios respectively which vary with vertical ratios of pertinent main compensation regions, respectively.

The method further includes the step of storing horizontal pixel coordinates respectively indicating the plurality of the guide lines and vertical pixel coordinates respectively representing upper and lower boundary lines of the main compensation regions after the step of setting upper and lower side boundary lines to the irregular defect region at every interval of the plurality of the guide lines to generate a plurality of main compensation regions.

The method further includes the step of, if the plurality of the upper side supplementary compensation regions are generated, storing only vertical pixel coordinates representing the upper side boundary lines of the upper side supplementary compensation regions, and sharing the horizontal pixel coordinates respectively representing the plurality of the guide lines and vertical pixel coordinates respectively representing upper side boundary lines of the main compensation regions.

The method further includes the step of, if the plurality of the lower side supplementary compensation regions are generated, storing horizontal pixel coordinates respectively representing the plurality of guide lines and vertical pixel coordinates respectively representing the upper and lower boundary lines of the lower side supplementary compensation regions independent from the plurality of the main compensation regions.

The method further includes the step of, if the left and right side supplementary compensation regions are generated, only storing a horizontal pixel coordinate representing a left side boundary line of a left side supplementary compensation region and a horizontal pixel coordinate representing a right side boundary line of a right side supplementary compensation region, and sharing the vertical pixel coordinates of the upper side boundary lines of the left and right side main compensation regions, respectively.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
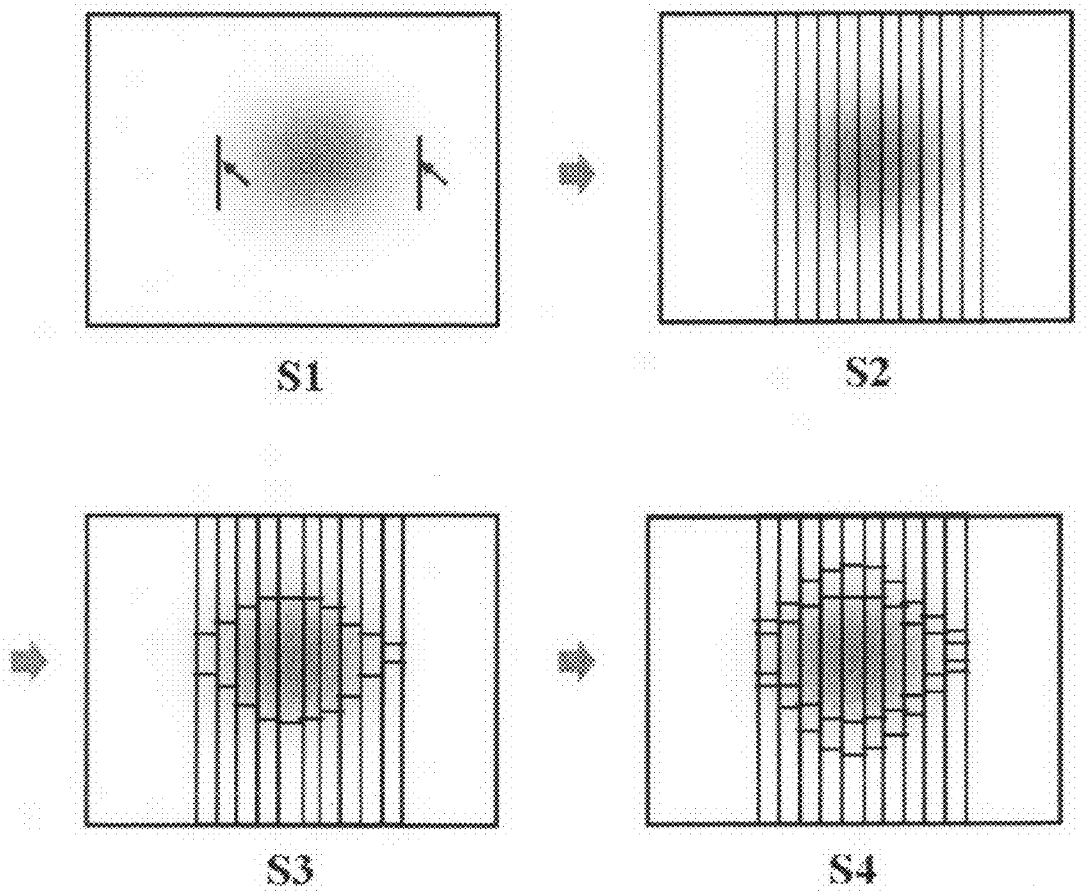
FIG. 1 illustrates diagrams showing the steps of a method for setting a compensation region for an irregular defect region in an image display device in accordance with a preferred embodiment of the present invention.

FIG. 1 illustrates diagrams showing the steps of a method for setting a compensation region for an irregular defect region in an image display device in accordance with a preferred embodiment of the present invention.

Referring to FIG. 1, the method for setting a compensation region for an irregular defect region in an image display device includes a first step S1 for setting a horizontal width of the irregular defect region, a second step S2 for making automatic generation of a plurality of guide lines which divide the irregular defect region in a horizontal direction along the horizontal width set thus, a third step S3 for generating a plurality of main compensation regions defined by the plurality of guide lines and upper and lower boundary lines, and a fourth step S4 for making automatic generation of a plurality of supplementary compensation regions positioned at upper, lower, left, and right sides of each of the main compensation regions.

In the first step S1, the horizontal width of the irregular display defect region displayed on the image display device is calculated with an inspection instrument. If the operator clicks a left side boundary point and a right side boundary point of the irregular display defect region displayed on the image display device, the inspection instrument calculates a number of pixels between the left and right boundary points automatically, to set the horizontal width of the irregular defect region.

In the second step S2, the plurality of guide lines are generated automatically, which divide the irregular display defect region in the horizontal direction along a size of the horizontal width set in the first step S1. The horizontal width of the irregular display defect region set in the first step S1 is divided with a preset number of a plurality of the main compensation regions to set intervals of the guide lines. Since each of the intervals of the guide lines is a horizontal width of each of the main compensation regions, the interval is set so as to maintain a balance of a dithering pattern used for making fine compensation of brightness in a compensation circuit. For an example, if the dithering pattern has a 4*4 pixel size, the interval of the guide lines which is a horizontal value of each of the main compensation regions may be set to multiples of 4. The plurality of guide lines having the intervals set thus are generated on a left side and a right side of a middle of the irregular defect region, automatically. The plurality of guide lines are vertical lines connecting an upper edge to a lower edge of the display region.

For an example, referring to FIG. 1, if the irregular defect region is divided into 10 main compensation regions, if the horizontal width of the irregular defect region is divided with 10 to set each of the intervals of the guide lines to 8 pixels, 11 guide lines each having 8 pixel interval are generated on the left side and the right side of the middle of the irregular defect region, automatically.

In the third step S3, an upper side line and a lower side boundary line of the irregular defect region are set to every interval between adjacent guide lines, to set a plurality of main compensation regions defined by the guide lines and the upper and lower boundary lines. As the operator clicks an upper side boundary point and a lower side boundary point of the irregular defect region at every interval of the guide lines, upper side and lower side boundary lines of each of the main compensation regions are generated. As a result of this, a plurality of the main compensation regions defined by the guide lines and the upper and lower boundary lines are set, respectively. X coordinates of each of the main compensation regions are set to horizontal direction pixel positions which falls on left and right side guide lines, and Y coordinates of each of the main compensation regions are set to vertical direction pixel positions which falls on the upper and lower side boundary lines.

In the fourth step S4, a plurality of the supplementary compensation regions are set to upper, lower, left, and right sides of the main compensation regions. If an inspector sets a vertical ratio of the upper and lower side supplementary compensation regions according to a degree of dispersion of the irregular defect regions, the upper side boundary line of an upper side supplementary region and the lower side boundary line of a lower side supplementary region are generated automatically at every interval of the guide lines according to the ratio of a vertical length of the main compensation region to define upper side and lower side supplementary compensation regions, automatically. Each of the upper side and lower side supplementary compensation regions has X coordinates the same with a relevant main compensation region, and Y coordinates set varied with a number of vertical direction pixels of each of the supplementary compensation regions. In this instance, in order to maintain a balance of the dithering pattern, if the dithering pattern has a 4*4 pixel size, a vertical ratio of the upper and lower side compensation regions is set to a multiple of 4, which can be expanded in a multiple of 4 in proportion to a size of the vertical ratio of relevant main compensation region. Moreover, a left side and a right side supplementary compensation regions (not shown) are generated automatically, at a left side and a right side of the main compensation region each having a size the same with an edge of the main compensation region. Each of the left side and right side supplementary compensation regions has a Y coordinate the same with an adjacent main compensation region, and an X coordinate set to have a space of the guide line from the X coordinate of the edge of the main compensation region.

Eventually, the method for setting a compensation region for an irregular defect of the present invention can set the plurality of main compensation regions and the supplementary compensation regions for the irregular defect by carrying out the first to fourth steps regardless of a kind of the irregular defect region if the irregular display defect is detected in an inspection process of the image display device. Particularly, because the calculation of horizontal width and division intervals of the irregular defect region enables automatic generation of the plurality of guide lines which divides the irregular defect region in a horizontal direction, the setting of a boundary of the irregular defect region is easy, and it can be induced that fixed shapes of the main compensation regions can be generated regardless of the inspector. Moreover, the automatic generation of the supplementary compensation regions at upper, lower, left, and right sides of the main compensation region enables to simplify description of operation and operation steps and shorten an operation time period. Since the same algorithm is applicable regardless of the kind of irregular region, the method is applicable universally.

Then, coordinate information on the main compensation regions and the supplementary compensation regions is stored in a memory, which is set by the method for setting a compensation region for an irregular defect of the present invention. In order to reduce a capacity of the memory, all the coordinates which set the main compensation regions and the supplementary compensation regions are not stored, but required x coordinates and y coordinates can be stored selectively as follows.

Figure 2:
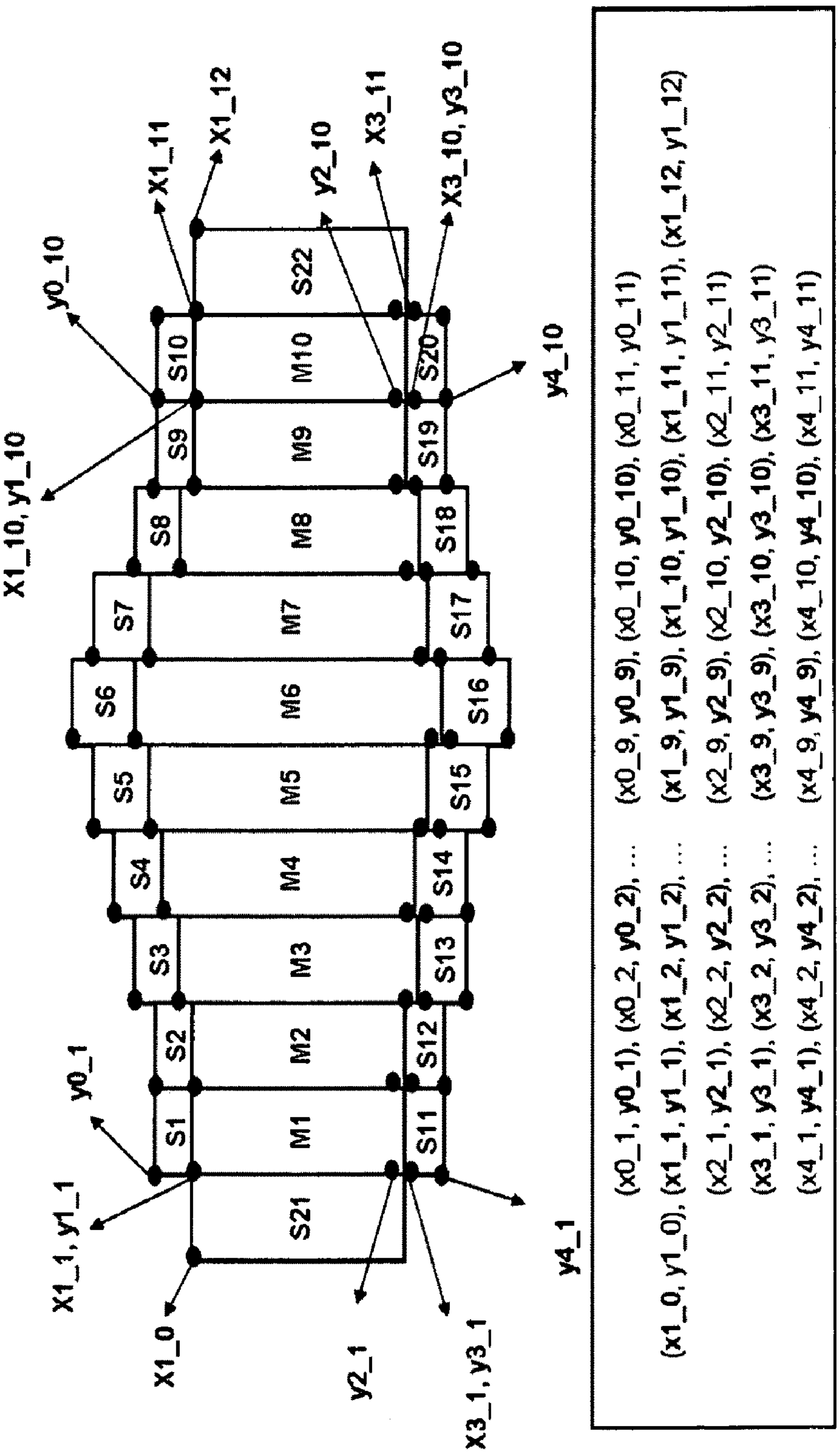
FIG. 2 illustrates a diagram showing coordinates set to the plurality of main compensation regions and a plurality of supplementary compensation regions in FIG. 1.

FIG. 2 illustrates a diagram showing 10 main compensation regions M1-M10 and 22 supplementary compensation regions S1-S22 at upper, lower, left, and right sides of the 10 main compensation regions, as an example.

Referring to FIG. 2, in order to set positions of the 10 main compensation regions M1-M10 and the 22 supplementary compensation regions S1-S22, total 57 coordinates are required. However, there are the same x coordinates and the same y coordinates in x coordinates and y coordinates of the 10 main compensation regions M1-M10 and 22 supplementary compensation regions S1-S22 respectively. Therefore, only x coordinates and y coordinates of the upper side supplementary compensation regions S1-S10, and the left and right side supplementary compensation regions S21 and S22 that do not duplicate with the x coordinates and y coordinates of the main compensation regions M1~M10 are stored, selectively. In the meantime, in order to share a storage space of the memory allocated to the position information on the compensation regions for the irregular defect with the compensation regions for the regular defect, the coordinates of the lower side supplementary compensation regions S11-S20 are set separately even if the coordinates duplicate with the coordinates of the main compensation regions M1-M10. In this case, a space for storage of the position information on the compensation regions for one irregular defect region can store the position information on the compensation regions for two regular defects.

In detail, 13 x1 coordinates (x1_0, x1_1, x1_2, - - - x1_9, x1_10, x1_11, and x1_12) denoting positions of left and right boundaries of the 10 main compensation regions M1~M10 and the two left and right side supplementary compensation regions S21 and S22, and 10 y1 coordinates (y1_1, y1_2, - - - y1_9, and y1_10) and 10 y2 coordinates (y2_1, y2_2, - - - y2_9, and y2_10) denoting positions of the upper and lower boundary lines of the 10 main compensation regions M1-M10 and the two left and right side supplementary compensation regions S21 and S22 are set. And 10 y0 coordinates (y0_1, y0_2, - - - y0_9, and y0_10) denoting the positions of the upper side boundary lines for the 10 upper side supplementary compensation regions S1-S10 are set.

And, 11 x3 coordinates (x3_1, x3_2, - - - x3_9, x3_10, and x3_11) denoting positions of left and right boundaries of the lower side supplementary compensation regions S11-S20, and 10 y3 coordinates (y3_1, y3_2, - - - y3_9, and y3_10) and 10 y4 coordinates (y4_1, y4_2, - - - y4_9, and y4_10) denoting positions of the upper and lower boundary lines of the lower side supplementary compensation regions S11-S20 are set. In this instance, the 11 x3 coordinates (x3_1, x3_2, - - - x3_9, x3_10, and x3_11) denoting positions of left and right boundaries of the lower side supplementary compensation regions S11-S20 are the same with the 11 x1 coordinates (x1_1, x1_2, - - - x1_9, x1_10, and x1_11) denoting positions of left and right boundaries of the 10 main compensation regions M1~M10, respectively. And, the 10 y3 coordinates (y3_1, y3_2, - - - y3_9, and y3_10) denoting positions of the upper side boundary lines of the lower side supplementary compensation regions S11-S20 are set by adding unity to the y2 coordinates (y2_1, y2_2, - - - y2_9, and y2_10) denoting positions of the lower boundary lines of the 10 main compensation regions M1-M10. Thus, though there are x coordinates and y coordinates that duplicate with the main compensation regions M1-M10, by setting the position information of the lower side supplementary compensation regions S11-S20 separate from the main compensation regions M1-M10, the space for storage of the position information on the compensation regions for one irregular defect can store the position information on the compensation regions for two regular defects.

Accordingly, of the total 57 (x,y) coordinates denoting position information on the plurality of compensation regions which are divisions of one irregular defect region, what is required is to store 24 x coordinates and 50 y coordinates, a space for storing the position information can be reduced. And, by storing the position information on the lower side supplementary compensation regions S11~S20 separate from the main compensation regions M1-M10, the space for storage of the position information on the compensation regions for one irregular defect can store the position information on the compensation regions for two regular defects.

In order to make a storage space for the position information on the compensation regions for the irregular defect and a storage space for the position information on the compensation regions for the regular defect to be used commonly, it is required that parameters for the position information on the compensation regions for the irregular defect and parameters for the position information on the compensation regions for the regular defect are reconciled.

Figure 3A:
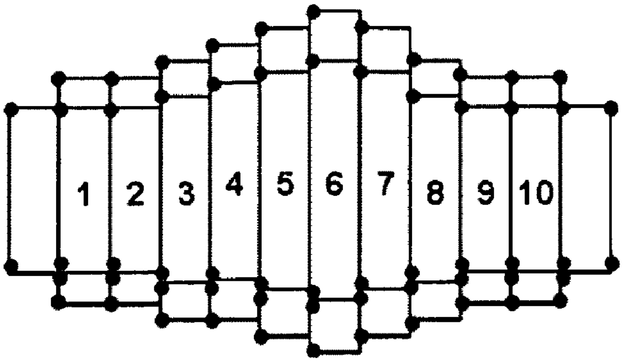
FIGS. 3A and 3B illustrate diagrams comparing coordinates set to a compensation region for one irregular defect region, and coordinates set to compensation regions for two regular defect regions.
Figure 3B:
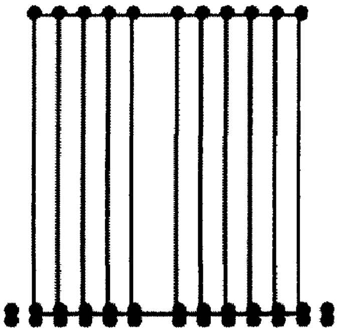
Figure 3B:
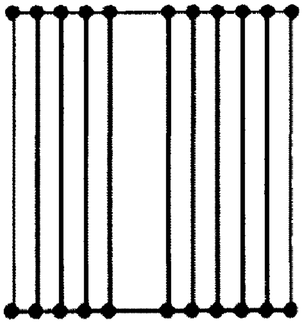

FIG. 3A illustrates a diagram of the coordinates of the positions of the compensation regions for one irregular defect, and FIG. 3B illustrates a diagram of the coordinates of the positions of the compensation regions for two regular defects.

Referring to FIG. 3A, as described with reference to FIG. 2, the position information on the 10 main compensation regions M1-M10 allocated for compensation of one irregular defect and the 22 supplementary compensation regions S1-S22 is set by 24 x coordinates and 50 y coordinates and stored in the memory. As shown in FIG. 3B, the position information on the 10 compensation regions allocated for compensation of a first regular defect are set by 13 x coordinates and 30 y coordinates, and the position information on the 10 compensation regions allocated for compensation of a second regular defect are set by 11 x coordinates and 20 y coordinates. Though the 10 compensation regions allocated for compensation of the first regular defect only require 11 x coordinates and 20 y coordinates the same as the compensation regions allocated for compensation of the second regular defect, the 10 compensation regions allocated for compensation of the first regular defect has two more x coordinates and 10 more y coordinates set further virtually for reconciling parameters with the FIG. 3A. According to this, the position information on the compensation regions for the two regular defects shown in FIG. 3B becomes to have 24 x coordinates and 50 y coordinates, which are the same with the parameters of the position information on the compensation regions for one irregular defect, the storage space for the position information on the compensation regions for the irregular defect and the storage space for the position information on the compensation regions for the regular defect to be used commonly.

Figure 4A:
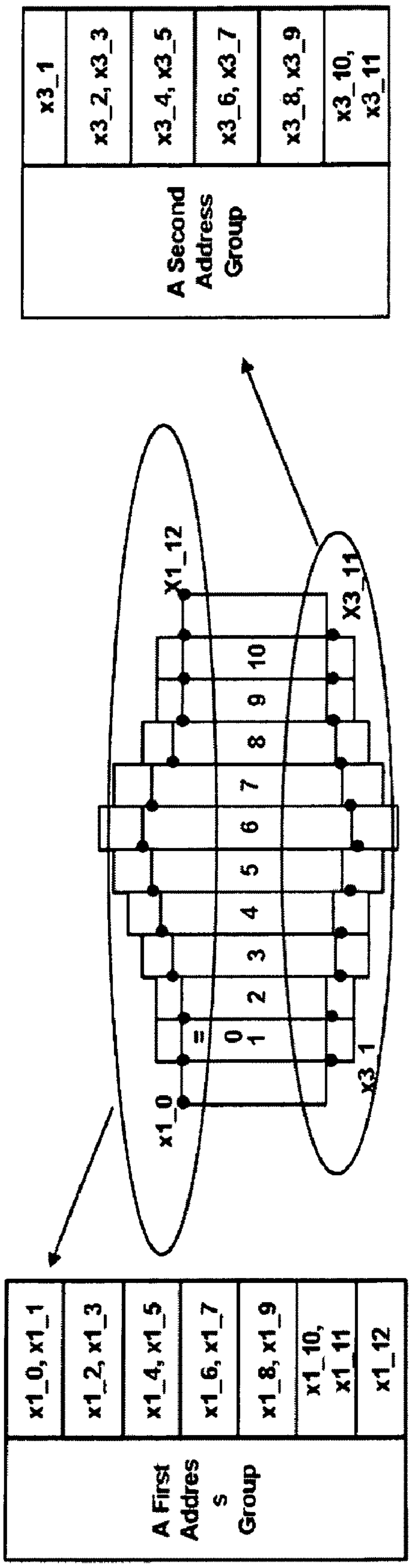
FIGS. 4A and 4B illustrate diagrams each showing a method for storing coordinates set to the compensation region for the irregular defect in FIG. 3A.
Figure 4B:
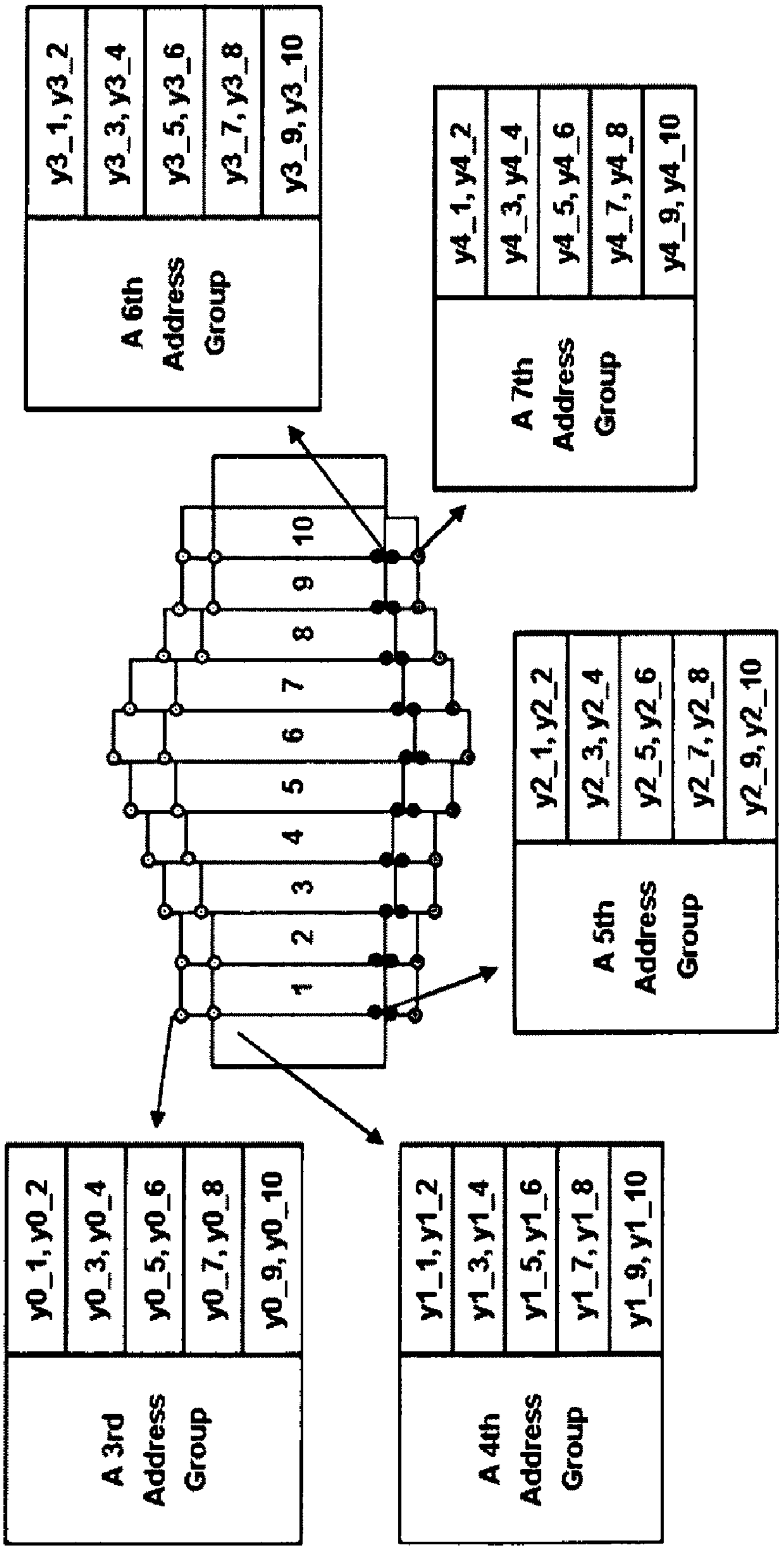

Referring to FIG. 4A, the 11 x1 coordinates (x1_1, x1_2, - - - x1_9, x1_10, and x1_11) denoting positions of left and right boundaries of the 10 main compensation regions M1~M10 for compensating one irregular defect set thus are stored in a first address group, and the 11 x3 coordinates (x3_1, x3_2, - - - x3_9, x3_10, and x3_11) denoting positions of left and right boundary lines of the lower side supplementary compensation regions S11-S20 set thus are stored in a second address group of the memory. Referring to FIG. 4B, the 10 y0 coordinates (y0_1, y0_2, - - - y0_9, and y0_10) denoting the positions of the upper side boundary lines for the upper side supplementary compensation regions S1~S10 set thus are stored in a third address group of the memory, the 10 y1 coordinates (y1_1, y1_2, - - - y1_9, and y1_10) denoting positions of the upper side boundary lines of the main compensation regions M1~M10 set thus are stored in a fourth address group, the 10 y2 coordinates (y2_1, y2_2, - - - y2_9, and y2_10) denoting positions of the lower side boundary lines of the 10 main compensation regions M1-M10 set thus are stored in a fifth address group, 10 y3 coordinates (y3_1, y3_2, - - - y3_9, and y3_10) denoting positions of the upper side boundary lines of the lower side supplementary compensation regions S11~S20 set thus are stored in a sixth address group, and the 10 y4 coordinates (y4_1, y4_2, - - - y4_9, and y4_10) denoting positions of the lower side boundary lines of the lower side supplementary compensation regions S11-S20 set thus are stored in a seventh address group.

Figure 5A:
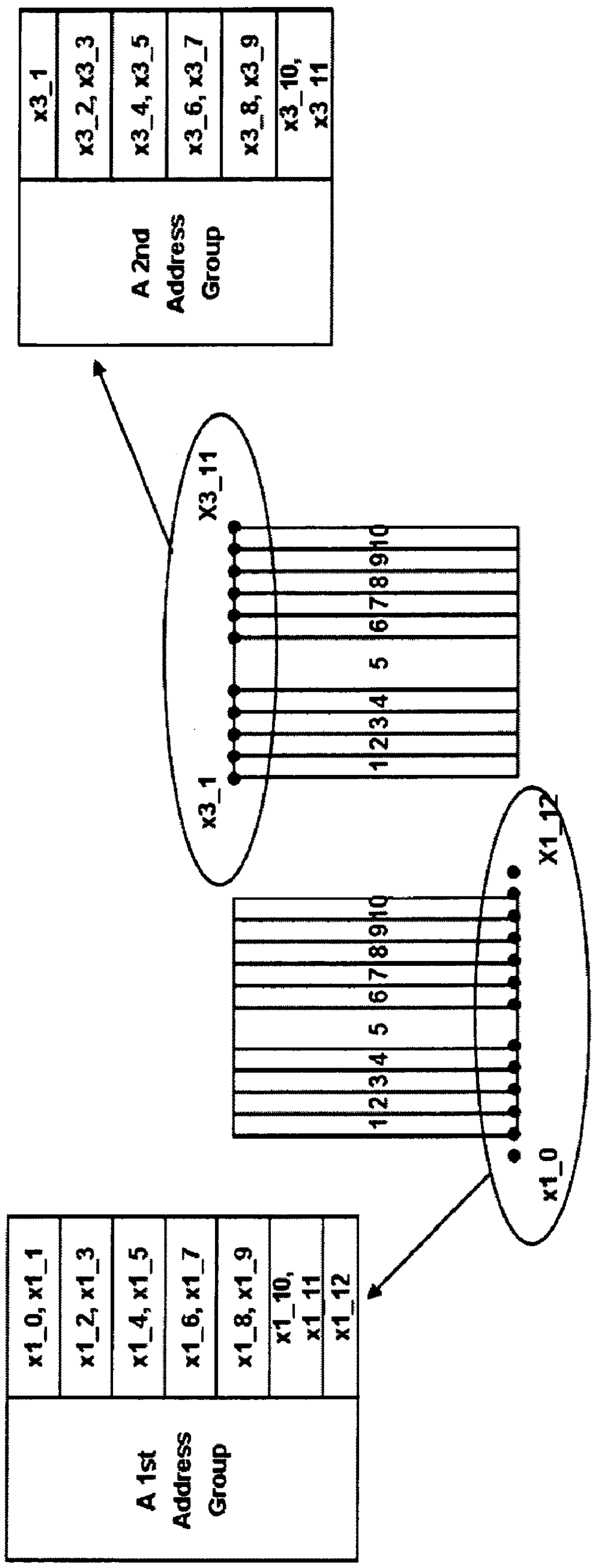
FIGS. 5A and 5B illustrate diagrams each showing a method for storing coordinates set to the compensation regions for the regular defects in FIG. 3B.
Figure 5B:
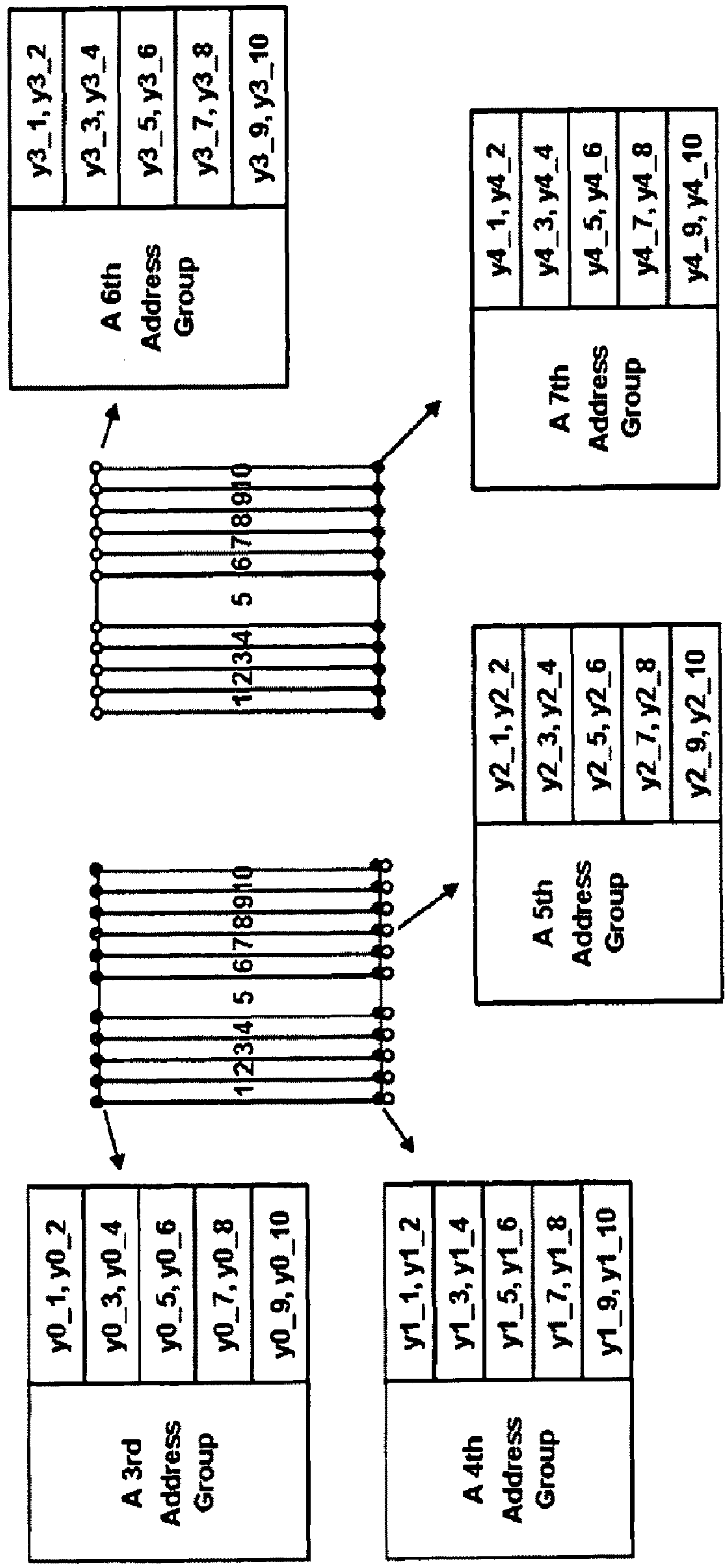

Referring to FIG. 5A, the 11 x1 coordinates (x1_1, x1_2, - - - x1_9, x1_10, and x1_11) denoting positions of left and right boundary lines of the 10 compensation regions allocated for compensating the first regular defect and the two virtual x coordinates set in FIG. 3B thus are stored in the first address group of the memory. The 11 x3 coordinates (x3_1, x3_2, - - - x3_9, x3_10, and x3_11) denoting positions of left and right boundary lines of the 10 compensation regions allocated for compensating two regular defects set thus are stored in the second address group of the memory. Referring to FIG. 5B, the 10 y0 coordinates (y0_1, y0_2, - - - y0_9, and y0_10) denoting the positions of the upper side boundary lines of the compensation regions for the first regular defect are set and stored in the third address group of the memory, the 10 y1 coordinates (y1_1, y1_2, - - - y1_9, and y1_10) denoting positions of the lower side boundary lines of the compensation regions for the first regular defect are set and stored in the fourth address group of the memory, the 10 y2 coordinates (y2_1, y2_2, - - - y2_9, and y2_10) are set virtually and stored in the fifth address group of the memory, the 10 y3 coordinates (y3_1, y3_2, - - - y3_9, and y3_10) denoting positions of the upper side boundary lines of the compensation regions for the second regular defect are set and stored in the sixth address group, and the 10 y4 coordinates (y4_1, y4_2, - - - y4_9, and y4_10) denoting positions of the lower side boundary lines of the compensation regions for the second regular defect are set and stored in the seventh address group.

By reconciling the parameters for position information on the compensation regions for one irregular defect and the parameters for position information on the compensation regions for two regular defects, the position information on the compensation regions for two regular defects can be stored in the space for storing the position information on the compensation regions for one irregular defect. As a result of this, the memory can be used commonly regardless whether the defect is regular or irregular, and, because the space for storing the position information on the compensation regions for the irregular defect and the space for storing the position information on the compensation regions for the regular defect can be used commonly, the capacity of the memory can be reduced in comparison to a case when the position information on the compensation regions for the irregular defect and the position information on the compensation regions for the regular defect are stored in addresses or memories different from each other.

Together with the position information on the plurality of main compensation regions and the plurality of supplementary compensation regions set for compensating the irregular defect, a compensation data for each of the compensation regions are set for each of gray scale sections and stored in the memory.

Figure 6:
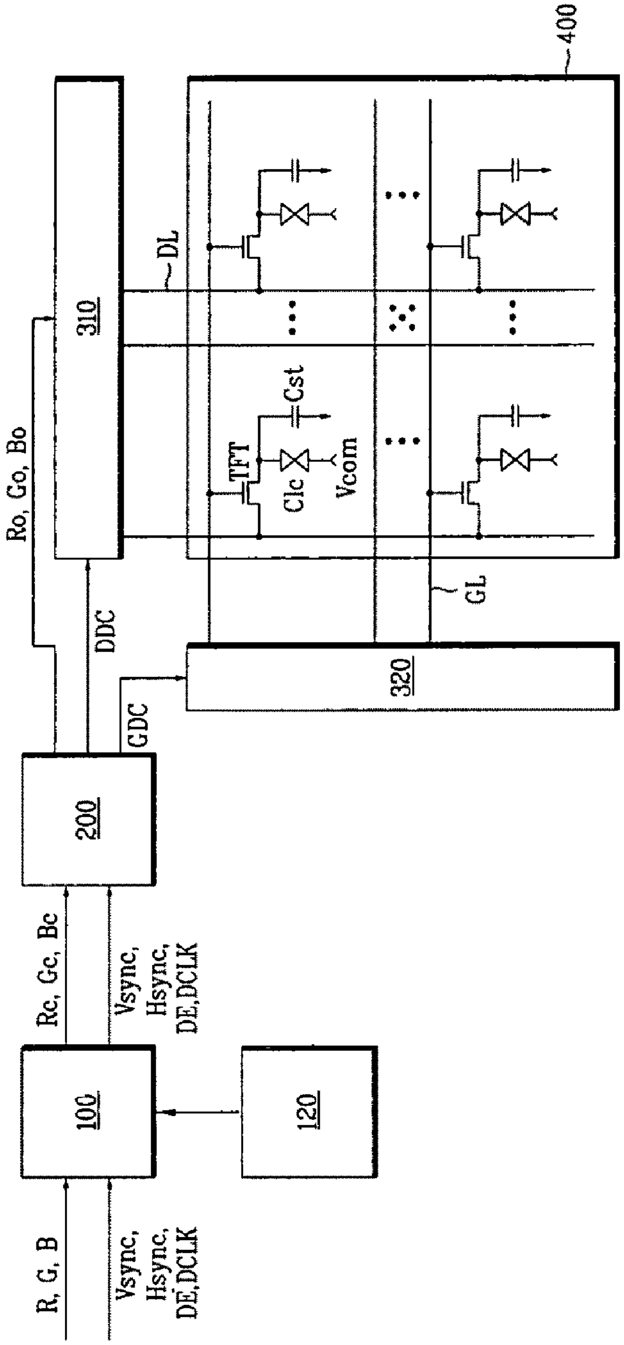
FIG. 6 illustrates a block diagram of a liquid crystal display device having the present invention applied thereto.

FIG. 6 illustrates a block diagram of a liquid crystal display device having an irregular defect to be compensated by applying the present invention thereto.

Referring to FIG. 6, the liquid crystal display device includes a compensation circuit 100, a timing controller 200, a data driver 310 and a gate driver 320 for driving a liquid crystal display panel 400, and a memory 120 connected to the compensation circuit 100. The compensation circuit 100 may be built-in the timing controller 200 to form a semiconductor chip. The memory 120 has position information PD1 on a plurality of the compensation regions set in advance by the method for setting a compensation region for an irregular defect, gray scale section information GD1, and a compensation data CD1. As shown in FIG. 2, the position information PD1 denotes position information on the plurality of upper, lower, left, and right side compensation regions. The gray scale section information GD1 denotes information on a plurality of gray scale sections divided according to gamma characteristics. The compensation data CD1, for compensation of a difference of brightness or color intensity of the defective region compared to a regular region, is stored sorted for each gray scale sections according to the positions of the defect regions. The memory 120 has point defect information, including the position information PD2 on point defects, the gray scale section information GD2, and the compensation data CD2, stored therein.

The compensation circuit 100 receives data R, G, B externally, and a plurality of synchronizing signals Vsync, Hsync, DE, DCLK. If it is determined that the data received thus is a data to be displayed on the compensation region with reference to the information PD1 on the compensation region for the irregular defect, the compensation circuit 100 compensates and forwards the data to be displayed on the compensation region by using a compensation data on a gray scale section pertinent to a gray scale value of the data received thus. The compensation circuit 100 disperses the compensated data in view of time and space by using frame rate control FRC dithering for making fine compensation of brightness. The compensation circuit 100 compensates and forwards the data to be displayed on the point defective region with reference to the information PD2, GD2, and CD2 on the point defective region stored in the external memory 120. Also, the compensation circuit 100 supplies the data Rc, Gc, Bc compensated thus and the plurality of synchronizing signals Vsync, Hsync, DE, and DCLK to the timing controller 200. The compensation circuit supplies the data to be displayed on a regular region to the timing controller 200 without compensation.

The timing controller 200 aligns and forwards the data Rc, Gc, Bc from the compensation circuit 100 to the data driver 310. The timing controller 200 also generates and forwards a data control signal DDC for controlling a driving timing of the data driver 310 and a gate control signal GDC for controlling a driving timing of the gate driver 320 by using the plurality of synchronizing signals Vsync, Hsync, DE, and DCLK.

The data driver 310 converts the digital data Ro, Go, Bo from the timing controller 200 into analog data by using the gamma voltage in response to the data control signal DDC from the timing controller 200 and forwards the analog data converted thus to the data line in the liquid crystal display panel.

The gate driver 320 drives the gate lines in the liquid crystal display panel 400 in succession in response to the gate control signal GDC from the timing controller 200.

The liquid crystal display panel 400 displays an image by means of a pixel matrix having a plurality of pixels. Each of the pixels produces a desired color by means of combination of red, green, and blue sub-pixels which control transmissivty of a light as alignment of the liquid crystals varies in response to a data signal. Each of the sub-pixels has a thin film transistor TFT connected to a gate line GL and a data line DL, a liquid crystal capacitor CLc and a storage capacitor Cst connected to the thin film transistor TFT in parallel. The liquid crystal capacitor CLc charges a difference of voltages of the data signal supplied to the pixel electrode through the thin film transistor TFT and a common voltage supplied to a common electrode therein and drives the liquid crystals according to the charged voltage to control the light transmissivity. The irregular defect regions and the point defect regions which can be contained in the liquid crystal display panel 400 as matter of a fabrication process display the data compensated by the compensation circuit 100. According to this, a difference of brightness between the regular region and the defect region can be prevented in the liquid crystal display panel 400, to improve a picture quality.

As has been displayed, the method for setting a compensation region for an irregular defect region of the present invention has the following advantages.

The suggestion of a standardized guide line in which the compensation regions are set automatically by calculating a horizontal width and an interval of the defect region permits to simplify the operation of setting the compensation regions for the irregular defect, to apply to defects regardless of the defects, and for the operator to make easy determination of boundaries of the irregular defect. Therefore, a time period required for setting the compensation regions for the irregular defect is shortened, to improve a productivity, and a picture quality can be improved by accurate compensation of the display defect regions.

Furthermore, the reconciliation of the parameters of the position information on the compensation regions for the irregular defect and the parameters of the position information on the compensation regions for the regular defect permits to store the position information on the compensation regions for two defects in a space for storing the position information on the compensation regions for an irregular defect. As a result of this, the memory can be used commonly regardless whether the defect is regular or irregular, and, because the space for storing the position information on the compensation regions for the irregular defect and the space for storing the position information on the compensation regions for the regular defect can be used commonly, the capacity of the memory can be reduced in comparison to a case when the position information on the compensation regions for the irregular defect and the position information on the compensation regions for the regular defect are stored in addresses or memories different from each other.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for setting a compensation region for an irregular defect region, comprising the steps of:

detecting an irregular display defect;

setting a horizontal width of the irregular defect region detected thus;

generating a plurality of guide lines which divide the irregular defect region in a horizontal direction along the horizontal width set thus, automatically;

setting upper and lower side boundary lines to the irregular defect region at every interval of the plurality of the guide lines to generate a plurality of main compensation regions defined by the plurality of guide lines and the upper and lower side boundary lines; and generating a plurality of upper, lower, left, and right supplementary compensation regions at upper, lower, left, and right sides of the plurality of main compensation regions, which maintain a gap of each of the plurality of the guide lines, automatically, wherein a width of each supplementary compensation region is the same as a width of each main compensation region, and wherein the widths of the main compensation region and the supplementary compensation region is set to multiples of a size of a dithering pattern, the dithering pattern used for compensation of brightness in a compensation circuit.

2. The method as claimed in claim 1, wherein the interval has a fixed width calculated by dividing the horizontal width of the irregular defect region with a preset numeral.

3. The method as claimed in claim 1, wherein the plurality of the upper and lower side supplementary compensation regions have vertical ratios respectively which vary with vertical ratios of pertinent main compensation regions, respectively.

4. The method as claimed in claim 1, further comprising the step of storing horizontal pixel coordinates respectively indicating the plurality of the guide lines and vertical pixel coordinates respectively representing upper and lower boundary lines of the main compensation regions after the step of setting upper and lower side boundary lines to the irregular defect region at every interval of the plurality of the guide lines to generate a plurality of main compensation regions.

5. The method as claimed in claim 4, further comprising the step of, if the plurality of the upper side supplementary compensation regions are generated, storing only vertical pixel coordinates representing the upper side boundary lines of the upper side supplementary compensation regions, and sharing the horizontal pixel coordinates respectively representing the plurality of the guide lines and vertical pixel coordinates respectively representing upper side boundary lines of the main compensation regions.

6. The method as claimed in claim 5, further comprising the step of, if the plurality of the lower side supplementary compensation regions are generated, storing horizontal pixel coordinates respectively representing the plurality of guide lines and vertical pixel coordinates respectively representing the upper and lower boundary lines of the lower side supplementary compensation regions independent from the plurality of the main compensation regions.

7. The method as claimed in claim 5, further comprising the step of, if the left and right side supplementary compensation regions are generated, only storing a horizontal pixel coordinate representing a left side boundary line of a left side supplementary compensation region and a horizontal pixel coordinate representing a right side boundary line of a right side supplementary compensation region, and sharing the vertical pixel coordinates of the upper side boundary lines of the left and right side main compensation regions, respectively.

* * * * *